United States Patent Office 3,052,658
Patented Sept. 4, 1962

3,052,658
UNSATURATED CHLOROMOLYBDATE
ESTERS AND POLYMERS
Murray Bloom, Los Angeles, Calif., assignor to Hughes Aircraft Company, Culver City, Calif., a corporation of Delaware
No Drawing. Filed June 3, 1957, Ser. No. 662,983
3 Claims. (Cl. 260—80)

This invention relates to a new polymer, and more particularly to a new group of unsaturated chloromolybdate esters and polymers. Such compositions may be advantageously used as heat resistant surface coatings.

The usual method of preparing a surface coating or paint is to disperse a pigment in a vehicle which may be a polymer solution. Upon exposure to relatively high heats, these coatings degrade as the polymer decomposes, if the polymer no longer has an affinity for the pigment, or if the pigment decomposes. Where the coating contains a pigment and a polymer vehicle which are part of the same molecule a greater affinity of the pigment for the vehicle may be expected.

It is therefore an object of the present invention to provide a new polymer wherein the ester molecule contains a metal.

It is another object of the present invention to provide a surface coating of a polymer containing both a pigment and a vehicle as part of the same molecule.

It is a further object of the present invention to provide a surface coating containing molybdenum and having a high heat resistant property.

Additional objects of the present invention will appear from the following detailed description taken in connection with the claims.

The product in accordance with the invention is generally prepared by adding finely powdered molybdenum pentachloride in small amounts to unsaturated alcohol while keeping the temperature below approximately 30° centigrade to retard the reaction. When the halide has been completely combined, the temperature is raised to the boiling point of the mixture and the reaction mixture is refluxed for approximately one hour. At the end of the reaction, the mixture is evaporated under reduced pressures to drive off the excess alcohol. The resulting black, porous ester is now dissolved in a solvent, such as acetone, and filtered to remove any unreacted molybdenum pentachloride or hydrolysis products. The polymer is formed by refluxing the filtrate over a period of about twelve hours with a suitable catalyst such as benzoyl peroxide.

Ordinarily, a surface coating material for high temperature applications may be made by dispersnig a pigment in a vehicle of some polymer solution. The polymer would under strong heating, burn off leaving the pigment which in turn might tend to blister or scale off. Since the pigment must have high heat resistance as well as some affinity for the surface to be protected, aluminum powder is generally used. The result is a coating which because of its color is neither a good absorber nor a good emitter of radiant energy. However, coatings made according to the present invention are dark in color and consequently are good absorbers and emitters based on Kirchhoff's laws of radiation. Since coatings made according to the present invention do not consist of a pigment dispersed in a vehicle, they overcome the disadvantages of existent coatings in that they do not tend to blister or flake off.

The following is an example of a typical method for preparing triallyl dichloromolybdate and its polymer. The results of this method of preparation yield a chloro ester which contains molybdenum within the ester molecule.

A given amount of allyl alcohol (for example, approximately 50 milliliters), chilled to about 30° centigrade to retard the reaction with the molybdenum pentachloride, is placed in a flask submerged in an ice bath. The flask is equipped with a reflux condenser, a stirrer, and a thermometer. Approximately 27 grams of finely powdered molybdenum pentachloride (with the given quantity of allyl alcohol) is slowly added over a period of about 30 minutes in small amounts to the alcohol while stirring the reactants. Since the reaction of the molybdenum pentachloride and the allyl alcohol is exothermic, the temperature of the reaction mixture is maintained below approximately 30° centigrade. After the entire quantity of molybdenum pentachloride has been added to the alcohol, the reactants are refluxed at a temperature of approximately 90° centigrade for about one hour and then evaporated at a pressure of about 25 millimeters to drive off the excess alcohol. Preferably, the reaction is conducted under anhydrous conditions so as to prevent possible hydrolysis of the reaction product or of the molybdenum pentachloride. The reaction product is a black porous frangible solid. This black residue, being the triallyl dichloro molybdate ester, is now dissolved in approximately 100 milliliters of acetone and filtered to remove any unreacted molybdenum pentachloride or hydrolysis products. The filtrate is black and is a mobile solution.

To form the polymer of triallyl dichloromolybdate, the filtrate is refluxed over a period of approximately twelve hours after the addition of about 1 gram of benzoyl peroxide catalyst. The resulting polymer solution is black and is now in condition to be used as a heat resistant coating without further treatment.

Polymerization of the ester which has been formed may be performed under the influence of any of a large number of free radical type catalysts which are well known to those versed in the art. They are classified in general as catalysts for vinyl polymerization as for example, benzoyl peroxide, acetyl peroxide, cumene hydroperoxide, acetone peroxide, and lauroyl peroxide, etc. Depending upon the ultimate use of the polymer, one may select any one of these catalysts used for vinyl polymerization. In some instances it may even be desirable to use more than one of these catalysts.

Samples of tin plated steel, dipped in an acetone solution of the polymer, have the appearance of having been dipped in black paint. A sample heated at 572° Fahrenheit for approximately one hour showed no signs of change. Another sample heated at approximately 752° Fahrenheit for one hour showed no evidence of blistering or flaking, both samples being in good mechanical condition.

The esters of the present invention are of the general type $MoX_a(OR)_b$ in which R is the radical derived from an unsaturated alcohol, X is chlorine or another halogen such as bromine iodine or fluorine, Mo is molybdenum and in which $a$ plus $b$ is equal to five.

In addition to allyl alcohol, other suitable unsaturated alcohols are those preferably having three to five carbon atoms in an unsaturated chain such as crotyl, methallyl, 2-chloroallyl, isopropenyl, α-ethylallyl alcohols, divinyl carbinol, ethyl vinyl carbinol, etc. If the chain has a large number of carbon atoms the heat resistant properties of the products of the invention will be diminished. The new chloro esters may be prepared from molybdenum pentachloride, a halogen substituted molybdic acid, by reaction with these unsaturated alcohols.

The esters are black, porous solids. They may be polymerized readily to form polymers for use as heat resistant coatings. They can also be used with other polymerizable molecules to form various novel co-polymers. Upon polymerization, various black colored substances are obtained which may vary from viscous oils or resins to brittle solids depending upon the extent of polymerization. In general, it is preferable to polymerize esters having three unsaturated groups since these polymerize more rapidly than esters having fewer unsaturated groups. Moreover, the probability of cross-linking is greater in the esters having larger numbers of unsaturated groups.

A viscous solution of the ester can be prepared with a suitable catalyst to impregnate cloth, paper, felt, leather, mineral wool, etc. After coating or impregnating, the object may be cured at suitable temperatures to complete the polymerization. The incomplete polymerization of the esters will result in materials which can yield viscous solutions. These solutions when mixed with a suitable catalyst can be used, as previously described, to impregnate various cloths or filamentous materials. They can also be used as a protective coating for various metals where the object coated is required to serve as a good absorber or an emitter of heat.

There has thus been disclosed a new group of unsaturated chloromolybdate esters and polymers and a method of preparation thereof. This group of unsaturated esters and polymers have particular application as heat resistant coatings for a variety of material and as a coating for material to be used as heat emitters or absorbers.

What is claimed is:

1. Triallyl dichloromolybdate.

2. The process for producing a polymer of triallyl dichloromolybdate for use as a surface coating which comprises: preparing a reaction mixture by adding powdered molybdenum pentachloride to chilled allyl alcohol in the approximate ratio of 27 grams of molybdenum pentachloride to 50 milliliters of allyl alcohol, refluxing the reaction mixture for approximately one hour, evaporating the reaction mixture at a pressure of approximately 25 millimeters to form a porous residue, dissolving said residue in acetone, filtering said dissolved residue, adding benzoyl peroxide catalyst in the approximate ratio of 1 gram of catalyst to 100 milliliters of said dissolved residue, and refluxing for approximately twelve hours, whereby a polymer is formed with molybdenum bound in the ester molecule.

3. The process for producing triallyl dichloromolybdate ester comprising: preparing an anhydrous reaction mixture by slowly adding powdered molybdenum pentachloride to an excess of chilled allyl alcohol in the approximate ratio of 27 grams of molybdenum pentachloride to 50 milliliters of allyl alcohol, maintaining the reaction mixture at approximately 30° centigrade to retard the exothermic reaction, refluxing said reaction mixture at approximately 90° centigrade for about one hour, evaporating said reaction mixture at a pressure of about 25 millimeters to drive off the excess allyl alcohol thereby to form the black, porous triallyl dichloromolybdate ester, dissolving said ester in acetone and filtering to remove any hydrolysis products or unreacted molybdenum pentachloride, whereby the resulting ester contains molybdenum which is bound in the ester molecule.

References Cited in the file of this patent
UNITED STATES PATENTS 2,775,563     Wiczer _____ Dec. 25, 1956
2,805,997     Benoit et al. _____ Sept. 10, 1957

OTHER REFERENCES

Partington: A Text-Book of Inorganic Chemistry, 6th Ed. (1953), pages 893–894, published by Macmillan & Co., Ltd., St. Martin's St., London.